UNITED STATES PATENT OFFICE.

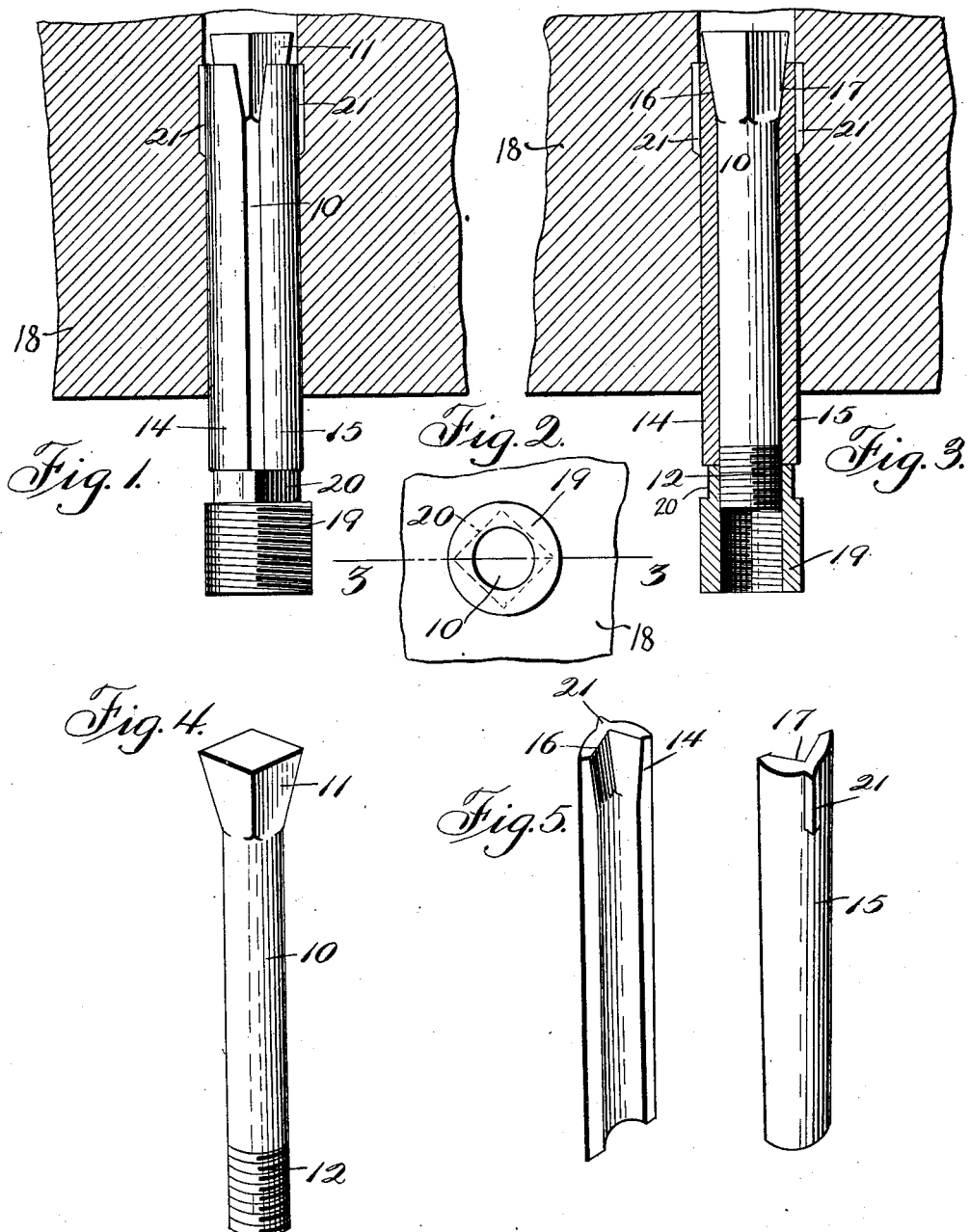

SOLOMON JEREMIAH, OF DUQUOIN, ILLINOIS.

ELECTRIC-WIRE SUPPORTER.

997,916.  Specification of Letters Patent.  Patented July 11, 1911.

Application filed October 12, 1908.  Serial No. 457,374.

*To all whom it may concern:*

Be it known that I, SOLOMON JEREMIAH, a citizen of the United States, residing at Duquoin, in the county of Perry, State of Illinois, have invented certain new and useful Improvements in Electric-Wire Supports; and I do hereby declare the following to be a full, clear, and exact description of the invention, such as will enable others skilled in the art to which it appertains to make and use the same.

This invention relates to devices for supporting electric wires, and more particularly adapted for use in suspending trolley and other wires in underground and similar localities, and has for one of its objects to simplify and improve the construction and increase the efficiency and utility of devices of this character.

Another object of the invention is to provide a simply constructed device of this character which may be readily applied in otherwise inaccessible localities, and which may be connected and disconnected from the supporting structure or body when required without destroying any of the parts of the device.

Another object of the invention is to provide a simply constructed device of this character which may be readily used, and transferred from one locality to another without detriment to the device.

With these and other objects in view the invention consists in a bolt or stock having a tapered enlargement at one end, and a divided shell inclosing the bolt and with tapered internal portions at one end corresponding to and engaging the tapered portion of the bolt, the shell adapted to be inserted into a socket in the supporting body.

The invention further consists in a bolt having a tapered enlargement at one end and threaded at the other end, a divided shell inclosing the bolt and with tapered internal portions corresponding to and engaging the tapered enlargement of the bolt, and a threaded sleeve engaging over the threaded portion of the bolt and bearing against the shell.

The invention further consists in certain novel features of construction as hereafter shown and described and specifically pointed out in the claim, and in the drawings illustrative of the preferred embodiment of the invention.

Figure 1 is a side elevation of the improved device, with the supporting structure in section. Fig. 2 is a bottom plan view of the same. Fig. 3 is a longitudinal section on the line 3—3 of Fig. 2. Fig. 4 is a perspective view of the bolt portion of the device detached. Fig. 5 represents the divided shell detached and in perspective.

The improved device comprises a bolt 10 which may be of any required size and is formed with a tapered enlargement 11 at one end and threaded as shown at 12 at the other end.

Inclosing the bolt 10 is a divided shell in two parts 14—15, the two parts of the shell provided at one end with tapered interior portions 16—17 which are right angular in cross section and corresponding to and adapted to bear against the tapered portion 11 of the bolt from opposite sides, the exterior of the bolt thus conforming to the interior of the two part shell. The divided shell is designed to be inclosed in a closely fitting socket within the structure from which the device is to be suspended and this structure may be the ceiling of a building, the roof of a mine gallery, the roof of a tunnel or conduit, or any other structure or body in which the trolley wire or other device is to be arranged, and for the purpose of illustration the socket is shown formed in a body represented conventionally at 18.

When the device is to be employed the bolt is arranged between the two parts of the socket with the tapered portion next to the internally tapered portions of the socket and extending beyond the same, so that the tapered portion of the socket does not engage in the tapered portions of the shell, the body portions of the shell thus bearing only against the body portion of the bolt. In this condition the shell having the bolt therein is thrust into the socket in the body 18 and the bolt drawn downwardly while the shell remains stationary, this movement causing the tapered portion 11 of the bolt to engage in the tapered portions 16—17 of the shell and distending the same, and crowding it against the walls of the socket. This action locks the shell firmly in the socket, and prevents it from dropping downwardly. As clearly shown, the bolt 10 is provided with a rectangular shaped head 11 which is formed integrally with the bolt, and each section 14 and 15 of the shell having semicircular smooth bolt receiving grooves formed along its length and communicating with the tapered ends of the sections, whereby said semicircular portions of the sections of the sleeve will move from the bolt when the parts are bindingly drawn together longitudinally. A threaded collar or sleeve 19 is then placed over the threaded portion of the bolt and rotated to draw the bolt forcibly downward into the shell, and thus impart a strong outward pressure against the parts of the shell and clamping them firmly in position.

The collar 19 is preferably externally threaded and adapted to receive the insulator supporting elements, not shown, as they form no part of the present invention. The member 19 is provided with a squared external portion 20 to receive the operating wrench or other implement. By this simple means an effectual suspending device is produced, which may be readily applied, and which will firmly support the conductor wires, trolley wires, and similar devices. The improved device may be readily detached when required, and inserted into a new socket, or transferred from one socket to another, as required.

The bolt and the shell members may be formed of any required size, to adapt the device to trolley wires of different sizes, and to trolley wires employed for different purposes.

The tapered portion 11 of the bolt is preferably formed square, or any other form than circular, and the tapered portions 16—17 of the shell will be formed to correspond thereto, as shown, so that the bolt will be firmly held from rotary movement in the socket and in the shell.

The shell members are formed with their upper portions flaring outwardly and with tapered V-shaped fins or ribs 21 upon the enlarged portions, the fins adapted to enter the supporting structure when the strains are applied and thus increase the grip of the shell members.

What is claimed is—

The herein-described electric wire supporter comprising a tubular cylindrical shell for insertion in a bore in the supporting body and composed of two segmental sections, each having a rib on its side at its inner end for engaging and embedding in the wall of said bore, said shell being further provided at the inner end with an inwardly tapering socket formed in the sections thereof when the same are brought into relative position with respect to one another, the tapering ends of said sections being substantially right angular in cross section, a bolt extending through and movable longitudinally in the bore of the shell thus formed and having a rectangular head provided with inwardly tapering sides corresponding with the shape of the socket of the shell to force the sections thereof apart and embed the ribs thereof in the wall of the bore, whereby the grooved portions of the sections are forced outwardly from the bolt when the parts are drawn together, and a collar screwed upon the outer end of the bolt and having a rectangular reduced portion bearing against the outer ends of the sections, said collar provided with means adapting an insulator to be attached thereto.

In testimony whereof, I affix my signature in presence of two witnesses.

SOLOMON JEREMIAH.

Witnesses:
F. W. DISBURG,
I. R. SPILMAN.